United States Patent
Loomis (10) Patent No.: US 8,406,996 B2
(45) Date of Patent: Mar. 26, 2013

(54) CORDLESS INERTIAL VEHICLE NAVIGATION

(75) Inventor: Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 343 days.

(21) Appl. No.: 12/868,604

(22) Filed: Aug. 25, 2010

(65) Prior Publication Data

US 2012/0053834 A1 Mar. 1, 2012

(51) Int. Cl.
*G01C 21/00* (2006.01)

(52) U.S. Cl. ........ 701/408; 701/532; 701/494; 701/500; 701/501; 701/503; 701/504; 701/505; 701/510; 701/536

(58) Field of Classification Search ............ 701/13, 701/38, 472, 532, 408, 494, 500, 501, 503, 701/504, 505, 510, 536; 342/357.12, 357.14, 342/357.03, 357.07, 357.3, 357.32, 357.2, 342/357.21

See application file for complete search history.

(56) References Cited

U.S. PATENT DOCUMENTS

| | | | | |
|---|---|---|---|---|
| 3,362,229 A * | 1/1968 | Trueblood | ......... | 73/504.02 |
| 5,629,810 A * | 5/1997 | Perry et al. | ......... | 359/872 |
| 6,154,692 A * | 11/2000 | Cielaszyk et al. | ......... | 701/13 |
| 7,010,409 B2 * | 3/2006 | Lu et al. | ......... | 701/70 |
| 7,650,252 B2 * | 1/2010 | Douglas | ......... | 702/95 |
| 7,711,483 B2 * | 5/2010 | Colley | ......... | 701/472 |
| 7,856,336 B2 * | 12/2010 | Van Wyck Loomis | ......... | 702/141 |
| 8,088,042 B2 * | 1/2012 | Limma et al. | ......... | 482/8 |
| 8,150,651 B2 * | 4/2012 | Loomis | ......... | 702/154 |
| 2003/0187555 A1 * | 10/2003 | Lutz et al. | ......... | 701/29 |
| 2005/0197769 A1 * | 9/2005 | Soehren et al. | ......... | 701/220 |
| 2006/0155440 A1 * | 7/2006 | Gleacher | ......... | 701/38 |
| 2006/0212182 A1 * | 9/2006 | Shaw | ......... | 701/12 |
| 2007/0067137 A1 * | 3/2007 | Ohkubo et al. | ......... | 702/142 |
| 2007/0282565 A1 * | 12/2007 | Bye et al. | ......... | 702/158 |
| 2008/0119970 A1 * | 5/2008 | Campbell et al. | ......... | 701/8 |
| 2009/0030605 A1 * | 1/2009 | Breed | ......... | 701/208 |
| 2009/0121932 A1 * | 5/2009 | Whitehead et al. | ......... | 342/357.12 |
| 2009/0295633 A1 * | 12/2009 | Pinto et al. | ......... | 342/357.14 |
| 2009/0309793 A1 * | 12/2009 | Loomis | ......... | 342/357.14 |
| 2009/0312975 A1 * | 12/2009 | Wyck Loomis | ......... | 702/96 |
| 2010/0109944 A1 * | 5/2010 | Whitehead et al. | ......... | 342/357.03 |
| 2011/0169689 A1 * | 7/2011 | Wang et al. | ......... | 342/357.3 |

* cited by examiner

*Primary Examiner* — Redhwan k Mawari
(74) *Attorney, Agent, or Firm* — NUPAT, LLC; Morrison Ulman (57) ABSTRACT

Inertial navigation systems for wheeled vehicles with constrained motion degrees of freedom are described.

25 Claims, 5 Drawing Sheets

CORDLESS INERTIAL VEHICLE NAVIGATION

TECHNICAL FIELD

The disclosure is generally related to inertial navigation systems for wheeled vehicles with constrained motion degrees of freedom.

BACKGROUND

Car and truck navigation systems based on global positioning system (GPS) receivers have become indispensable aids for both business and pleasure driving. Such systems do not work well, however, when signals from GPS satellites are obscured or unavailable as may happen when driving in a tunnel or urban canyon environment. To combat problems from GPS signal loss, inertial measurement units (IMU) are combined with GPS receivers to provide dead reckoning as a supplement to satellite navigation.

In typical GPS+IMU systems a yaw gyro estimates rate of change of heading while a tachometer counts revolutions of a transmission shaft to estimate speed. The need for a mechanical tachometer is often inconvenient, however. What is needed is a cordless GPS+IMU system in a box that does not require external wired sensors.

DETAILED DESCRIPTION

One way to build a cordless GPS+IMU navigation system is to combine measurements from GPS, 3-axis rotation rate gyros and 3-axis accelerometers in a Kalman filter or similar estimation algorithm. Such systems have been studied for decades and are routinely employed in aerospace navigation.

Practical difficulties arise, however, when cost is a significant design criterion. Rate gyros and accelerometers based on micro-electromechanical systems (MEMS) are attractive because of their compact size and low cost. Unfortunately MEMS gyros build up milliradian level errors quickly. A one milliradian vertical error leads to a one centimeter per second squared horizontal acceleration error—an effect that quickly degrades positioning accuracy. Thus, a traditional GPS+IMU system design is not optimal for cars and trucks because of errors in low-cost sensors.

A solution to the problem, of building a low cost cordless GPS+IMU navigation system having acceptable accuracy for cars and trucks depends in part on recognition of constraints inherent in the typical motion of these vehicles. FIGS. 1A and 1B show a wheeled vehicle that has yaw, longitudinal acceleration and rate-of-climb degrees of freedom.

Figure 1:
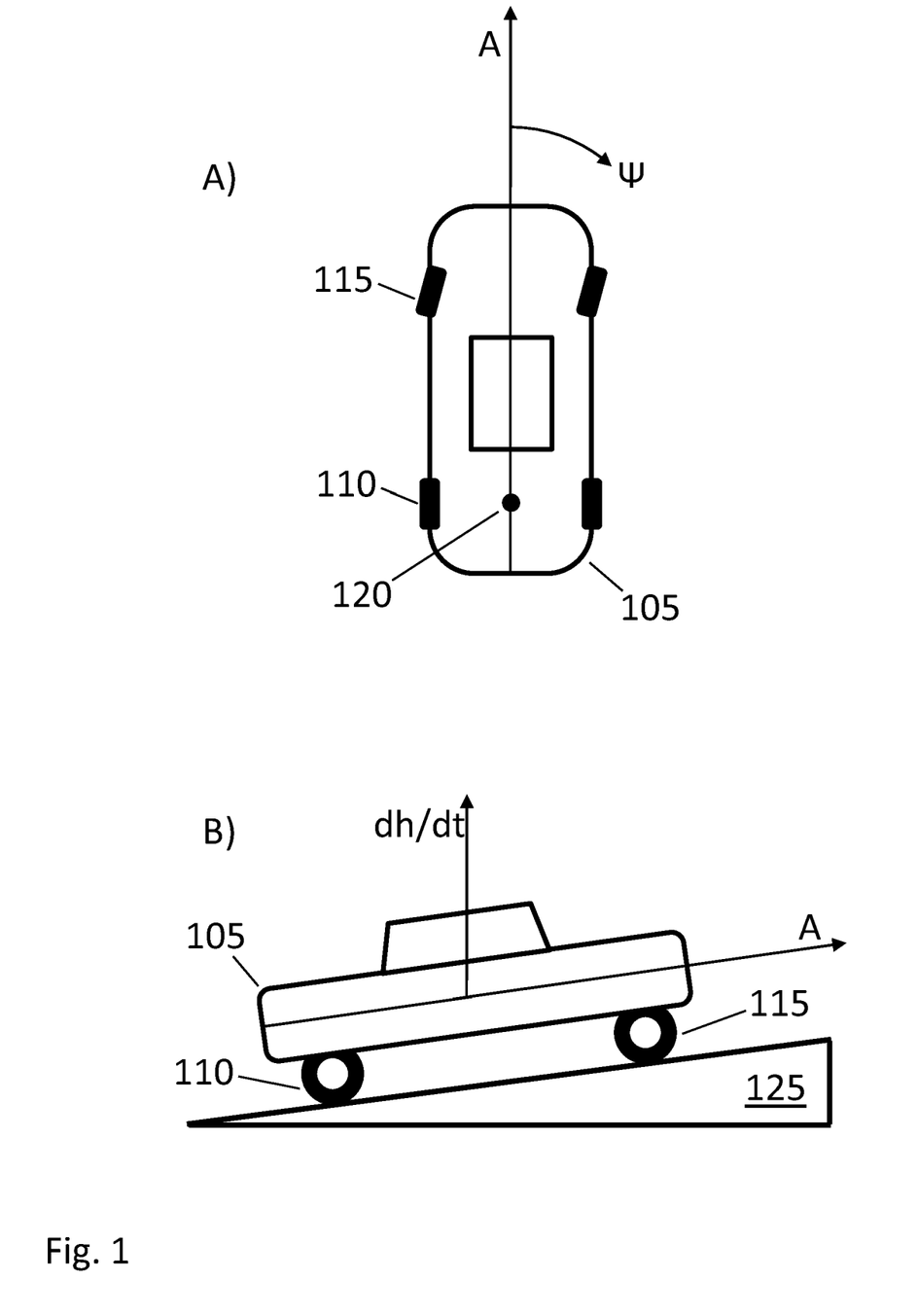
FIGS. 1A and 1B show a wheeled vehicle that has yaw, longitudinal acceleration and rate-of-climb degrees of freedom.

In FIG. 1, a wheeled vehicle 105, e.g. a car or truck, is shown in plan (A) and profile (B) views. The vehicle has four wheels, two of which are not steerable (e.g. 110) and two of which are steerable (e.g. 115). (Wheeled vehicles may also have three, four or more wheels, one or more of which may be steerable.) When the vehicle turns it yaws around a pivot point 120 located approximately halfway between the non-steerable wheels. In FIG. 1B the vehicle is seen driving on a hill 125.

The vehicle shown in FIG. 1 has three degrees of freedom: yaw, $\psi$; longitudinal acceleration, A; and rate-of-climb, dh/dt. Motion of the vehicle is affected by a steering wheel that controls yaw rate, stop and go pedals that control longitudinal acceleration, and by terrain, i.e. hills and valleys, that affect rate-of-climb. These motions may be measured with a yaw gyro, a longitudinal accelerometer and an altimeter, all of which may be MEMS devices.

It is not necessary to measure roll, lateral acceleration or vertical acceleration, and omitting such measurements eliminates the accumulation of their associated measurement errors. In cars, trucks and similar wheeled vehicles lateral acceleration is safely assumed to be equal to centripetal acceleration. These simplifications are not applicable to bicycles and motorcycles (which do experience significant roll) or other unconstrained objects.

Figure 2:
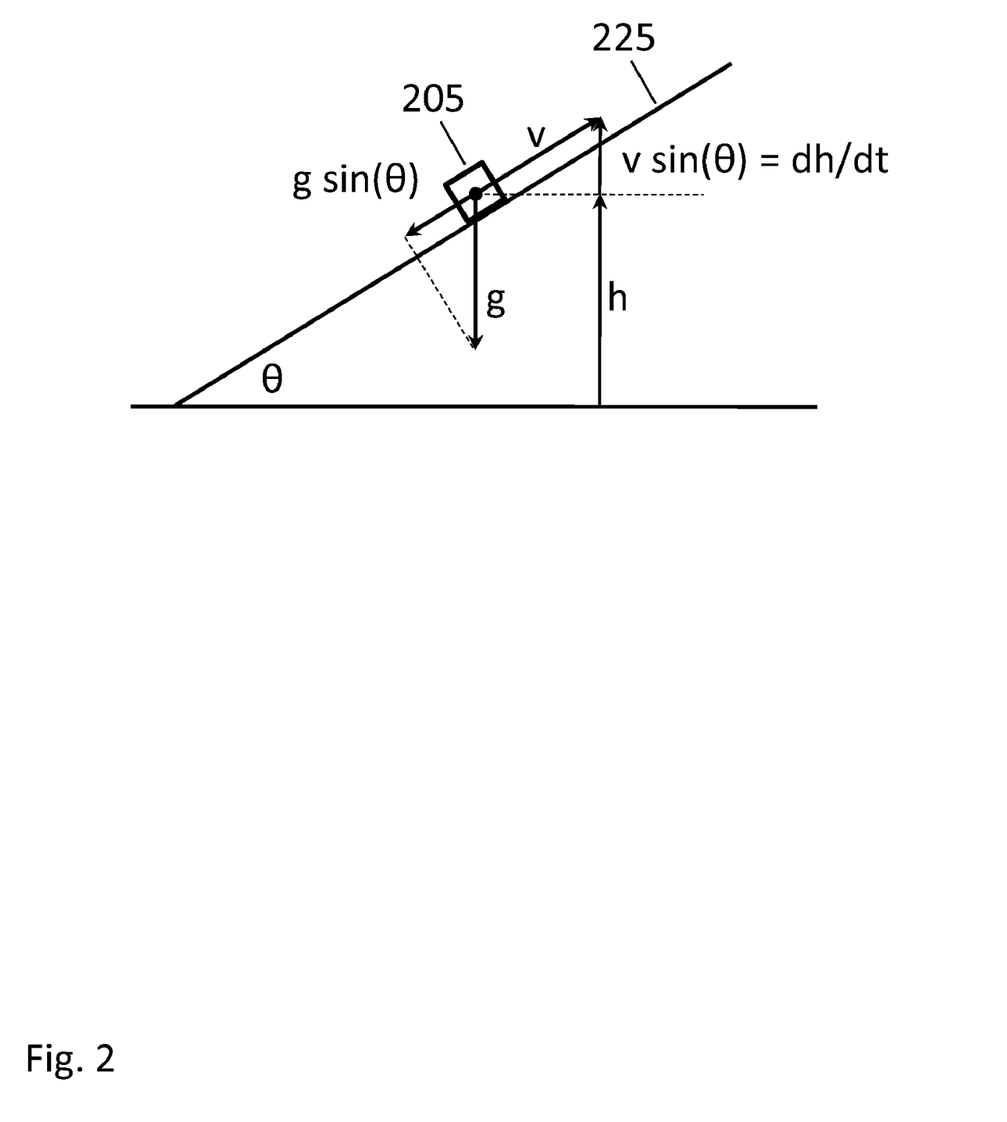
FIG. 2 is a diagram showing geometric relationships associated with estimating speed with a longitudinal accelerometer and an altimeter.

Given a vehicle with longitudinal acceleration and rate-of-climb degrees of freedom, dead reckoning based on a longitudinal accelerometer and an altimeter is one possible way to estimate speed. FIG. 2 is a diagram showing geometric relationships associated with estimating speed in this manner. In FIG. 2, a vehicle 205 (illustrated simply as a square block) is travelling on a slope 225. The angle of the slope with respect to the horizon is $\theta$, the height of the vehicle (above mean sea level or any other convenient reference plane) is h, and the speed of the vehicle on the slope is v.

Inspection of FIG. 2 reveals that:

$$\frac{dv}{dt} = A - g\sin\theta \text{ and } \sin\theta = \frac{1}{v}\frac{dh}{dt}$$

where g is the acceleration due to gravity near the surface of the earth and A is the longitudinal acceleration of the vehicle. Therefore, $$\frac{dv}{dt} = A - \frac{g}{v}\frac{dh}{dt}$$

and thus speed may be estimated given measurements of longitudinal acceleration and height. A difficulty of this approach, however, is the singularity at v=0. The cordless GPS+IMU navigation system described here avoids zero speed problems by adding a pitch gyro and combining altimeter, longitudinal accelerometer and pitch gyro measurements in a Kalman filter.

The cordless GPS+IMU system is designed to be self calibrating such that it may be placed in a vehicle without careful alignment of the MEMS gyros and accelerometer to the vehicle's axes. Self calibration is the process by which relationships between IMU, vehicle and earth-fixed reference frames are established.

The measurement reference frame M(x, y, z) is the frame in which accelerometer and rate gyro measurements are made. The vehicle or body reference frame B(f, r, d) ["forward", "right", "down"] is the frame aligned with the axes of the vehicle in which the cordless GPS+IMU system operates.

The earth-fixed reference frame E(E, N, U) ["East", "North", "Up"] is the frame of reference in which GPS measurements are reported.

Two examples of methods for self calibration are described. The first is blind calibration in which the orientation of body frame B is found in terms of measurement frame M. The second is delta-V calibration in which the orientation of measurement frame M is found in terms of earth-fixed frame E, and the orientation of body frame B is also found in terms of earth-fixed frame E. This information is then used to find the orientation of body frame B in terms of measurement frame M.

In blind calibration the direction of greatest acceleration (M frame) measured over a period of a few minutes lies along the vertical (yaw) axis (B frame). The direction along which changing acceleration (M) is observed when yaw is near zero is the longitudinal (roll) axis (B). Finally, the lateral (pitch) axis (B) is perpendicular to the other two axes.

In delta-V calibration the orientation of measurement frame M is found in terms of earth-fixed frame E by matching changes in velocities measured by IMU sensors and by GPS. Next, the orientation of body frame B is found in terms of earth-fixed frame E. Because of "rubber wheel" constraints, the B forward ("f") direction is equal to the direction of the GPS (E frame) velocity at any moment. (Rubber wheel vehicles do not slide sideways.) The average (over a few minutes) B down ("d") direction is parallel to the E frame up ("U") direction. Finally, the lateral (pitch) axis (B) is perpendicular to the other two axes. Once M and B are both known in terms of E, the relationship between M and B may be deduced.

Other calibration methods are possible. In general, the relationship between the vertical axes of the body and measurement frames may be deduced from the direction of greatest acceleration (M frame) measured over a period of a few minutes. This direction is parallel to the vertical (yaw) axis (B frame). The longitudinal (roll) axis (B frame) may then be determined by comparing accelerations measured by MEMS accelerometers to accelerations determined from a history of position measurements reported by a position sensor such as a GNSS receiver.

Yaw rate gyro measurements may be used to improve the accuracy of longitudinal (roll) axis determination because lateral acceleration as measured by yaw rate multiplied by speed ($\omega_\psi v$) is, in practice, more accurate than lateral acceleration determined by differencing GNSS speed measurements ($\Delta v$).

When a horizontal acceleration, A, is measured in both the M (x, y) frame (by accelerometers) and the B (f, r) frame (by GNSS speed differences), components $A_f, A_r, A_x$ and $A_y$ of the acceleration are related by:

$$\begin{bmatrix} A_f \\ A_r \end{bmatrix} = \begin{bmatrix} \cos c & \sin c \\ -\sin c & \cos c \end{bmatrix} \begin{bmatrix} A_x \\ A_y \end{bmatrix}$$

where c is the constant angle that best satisfies the relationship over time. Alternatively, the angle between the M and B frames in the horizontal plane may be calculated as: a tan $2(A_f, A_r)$—a tan $2(A_x, A_y)$.

A previously self-calibrated cordless GPS+IMU system may use calibration information stored in memory to speed up self calibration procedures. Even after self calibration has determined the relative orientation of the M and B reference frames, the position of the cordless GPS+IMU system within a vehicle may affect IMU sensor measurements. For example, a horizontal acceleration error occurs during turns if a longitudinal accelerometer is located away from the pivot point of a vehicle.

Figure 3:
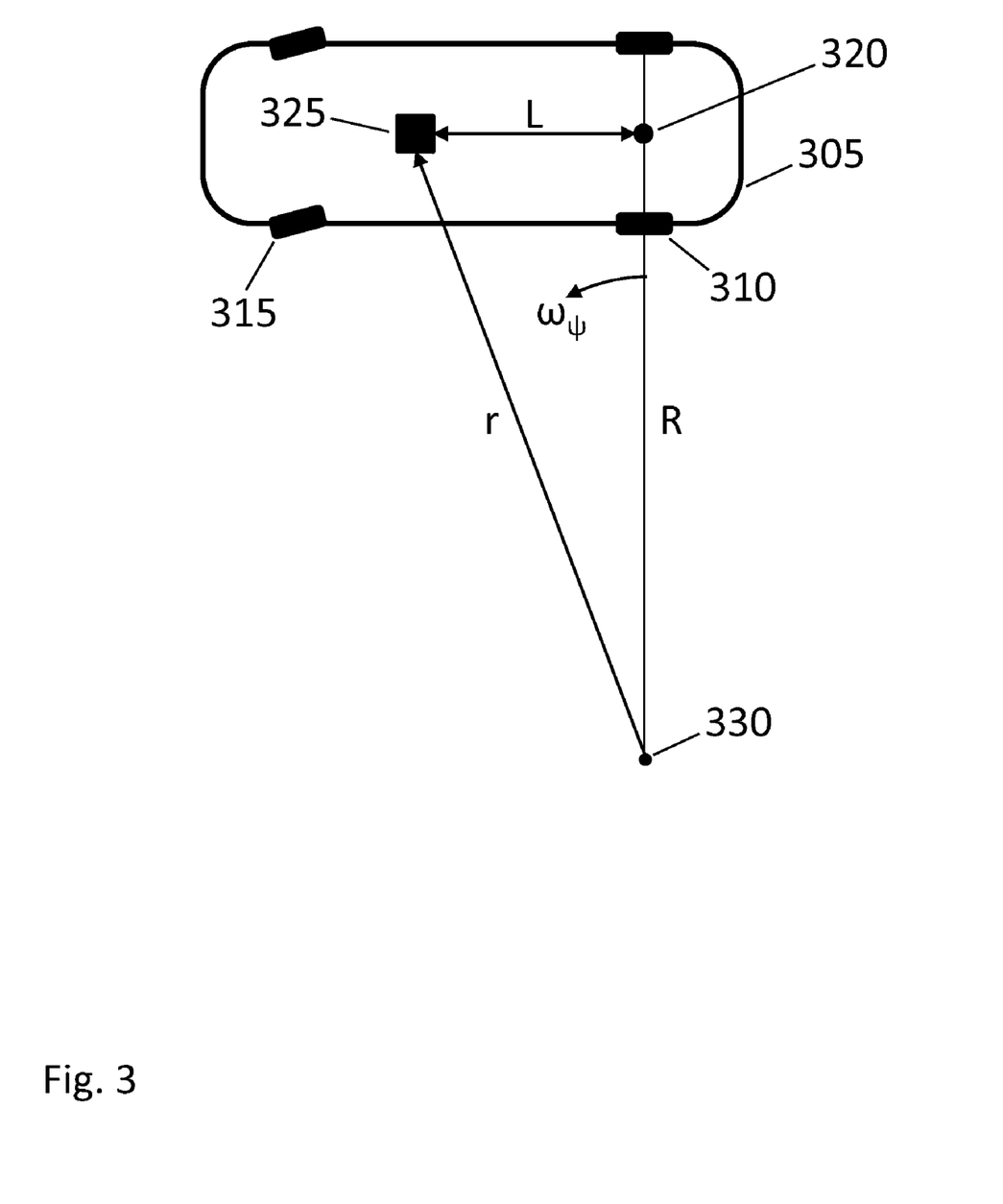
FIG. 3 is a diagram showing geometric relationships associated with errors that occur in measurements of longitudinal acceleration in a turning vehicle.

FIG. 3 is a diagram showing geometric relationships associated with errors that occur in measurements of longitudinal acceleration in a turning vehicle. In FIG. 3 a wheeled vehicle 305, e.g. a car or truck, is shown executing a turn. The vehicle has non-steerable wheels (e.g. 310) and steerable wheels (e.g. 315). The vehicle's pivot point 320 lies halfway between the non-steerable wheels. A longitudinal accelerometer is represented by block 325; it is located a distance L ahead of the pivot point. (L is referred to as "accelerometer arm", for lack of a better term.) The radius of turn of the vehicle is R, the distance from the center of the turn 330 to the longitudinal accelerometer is r, and the rate of turn (i.e. the vehicle's yaw rate) is $\omega_\psi$. The centrifugal force at the accelerometer is $\omega_\psi^2 r$, and the longitudinal component of this force, which is what is measured by the longitudinal accelerometer, is $$\omega_\psi^2 r \frac{L}{R} \sim \omega_\psi^2 L.$$

This error is removed in the cordless GPS+IMU navigation system by subtracting $\omega_\psi^2 L$ from longitudinal accelerometer measurements.

The cordless GPS+IMU navigation system thus operates under several practical constraints summarized in Table 1:

TABLE 1

GPS + IMU system constraints.

| Constraint | Consequence |
| --- | --- |
| Low-cost MEMS sensors. | Gyro and accelerometer measurement errors accumulate quickly. |
| Wheeled vehicle (e.g. car or truck). Lateral acceleration may be considered equal to centripetal acceleration. | Lateral acceleration, vertical acceleration and roll are ignored. No roll rate gyro needed. |
| Need to estimate both zero and non-zero speeds accurately. | Pitch rate, altimeter and longitudinal acceleration measurements are combined to avoid zero speed singularity. |
| System may be placed in a vehicle without careful alignment to vehicle axes. | System self-calibrates sensors to establish relative orientation of measurement and body frames of reference. |
| Longitudinal accelerometer may be mounted away from vehicle pivot point. | Longitudinal accelerometer measurements are corrected for longitudinal component of centrifugal force in turns. |

Figure 4:
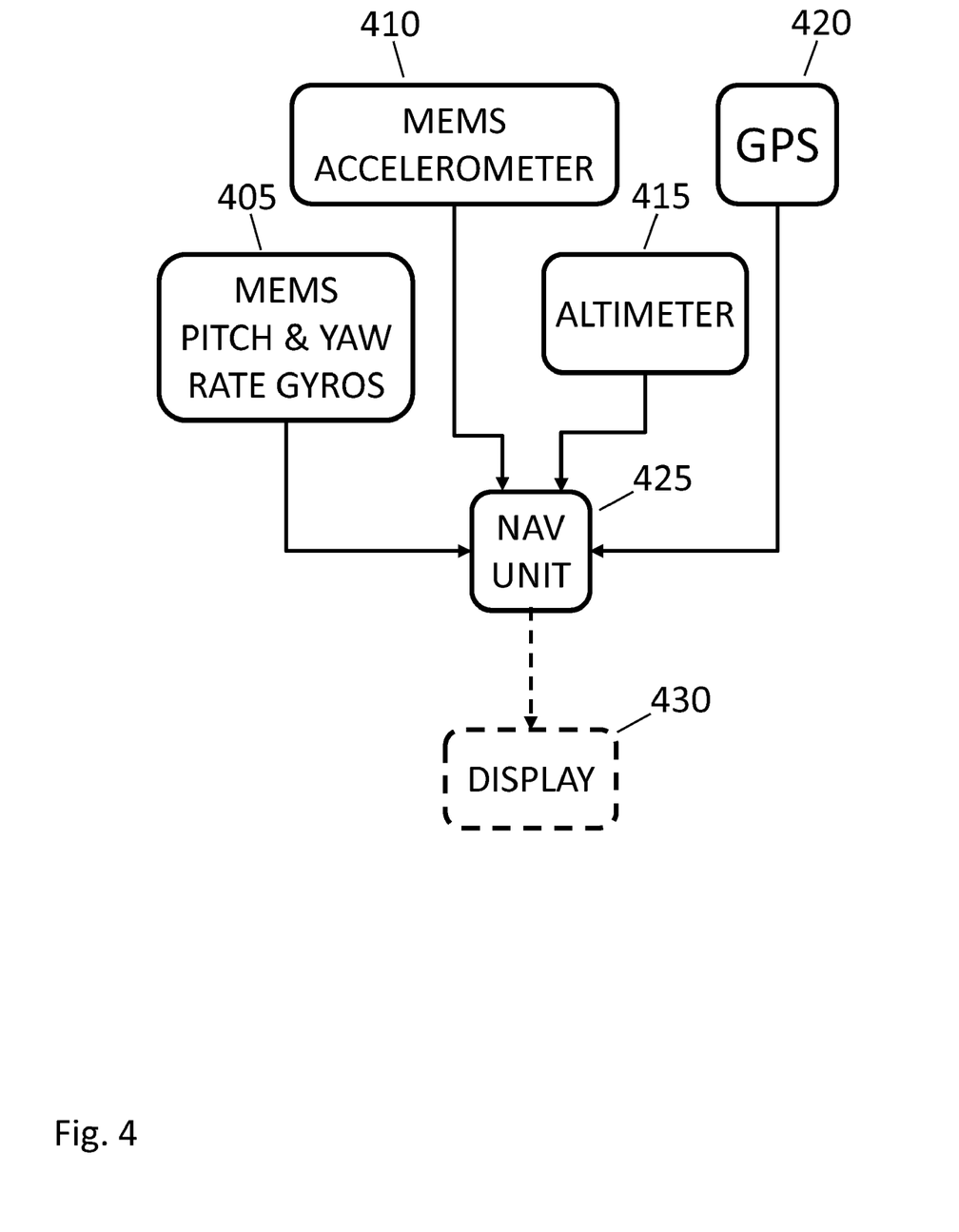
FIG. 4 is a block diagram of a cordless GPS+IMU system.

FIG. 4 is a block diagram of a cordless GPS+IMU system that operates in accordance with all of the constraints of Table 1. In FIG. 4, MEMS pitch rate and yaw rate gyros 405, MEMS accelerometer 410, altimeter 415 and GPS receiver 420 all provide measurement inputs to navigation unit 425. The navigation unit contains a processor that uses a Kalman filter to combine measurement inputs to estimate position, heading and speed. The navigation unit may be connected to an optional display 430. The navigation unit includes a memory which may contain map information; the map information may be used for map-matching to improve positioning accuracy on roads. The system may also include a wireless communication unit to transmit vehicle position and speed information to others. The entire cordless GPS+IMU system may be contained in a compact package that may be quickly and conveniently placed on a vehicle dashboard, for example. The system may also be implemented in a personal digital assistant, smart phone, or other general purpose device having the necessary sensors.

MEMS, six-degree-of-freedom combination rate gyro and accelerometer units are readily available at low cost. After self-calibration procedures described above, the output from one of these units may be manipulated to create that of a virtual longitudinal accelerometer, pitch rate gyro and yaw rate gyro oriented in the B reference frame. The constraints of wheeled vehicles and low-cost MEMS sensors (see e.g. FIG. 1 and Table 1) create a situation in which using only these three measurements (i.e. ignoring lateral and vertical acceleration, and roll) is preferable to using, measurements along all six possible axes.

The navigation unit executes a Kalman filter to combine IMU and GPS measurements. The filter is arranged such that altimeter rate is the measurement variable, and gyro and accelerometer measurements are control variables that appear in the state dynamics equations. Vehicle speed is determined through the combination of longitudinal acceleration, pitch rate and altimeter measurements. Some of the state variables are measured by GPS when GPS signals are available. Lateral acceleration, vertical acceleration, and roll rate are not used in the filter.

Kalman filter states, dynamics equations and measurement equations are presented in Tables 2 through 5:

TABLE 2

Kalman filter state variables and dynamics equations.

| State Description | State Variables | State Dynamics Equations |
|---|---|---|
| East | E | $\dot{E} = v \sin \gamma \cos \theta$ |
| North | N | $\dot{N} = v \cos \gamma \cos \theta$ |
| Up | U | $\dot{U} = v \sin \theta$ |
| Speed | v | $\dot{v} = A - \beta_A + v_v - g \sin \theta - \omega_\psi^2 L$ |
| Heading | γ | $\dot{\gamma} = (\omega_\psi - \beta_\psi + v_\psi)/\cos \theta$ |
| Pitch | θ | $\dot{\theta} = \omega_\theta - \beta_\theta + v_\theta$ |
| Accelerometer arm | L | $\dot{L} = 0$ |
| Accelerometer bias | $\beta_A$ | $\dot{\beta}_A = 0 + v_A$ |
| Yaw rate gyro bias | $\beta_\psi$ | $\dot{\beta}_\psi = 0 + v_\psi$ |
| Pitch rate gyro bias | $\beta_\theta$ | $\dot{\beta}_\theta = 0 + v_\theta$ |
| Altimeter rate bias | $\beta_h$ | $\dot{\beta}_h = 0 + v_h$ |

TABLE 3

Kalman filter control variables.

| Control Description | Control Variables | |
|---|---|---|
| Yaw rate gyro measurement | $\omega_\psi$ | Control Variables appear in |
| Pitch rate gyro measurement | $\omega_\theta$ | State Dynamics Equations |
| Longitudinal accelerometer measurement | A | |

TABLE 4

Kalman filter measurement variable and measurement equation.

| Measurement Description | Measurement Variable | Measurement Equation |
|---|---|---|
| Altimeter rate | $\dot{h}$ | $\dot{h} = v \sin \theta - \beta_h + v_h$ |

TABLE 5

Kalman filter GPS measurement variables and measurement equations.

| GPS Measurement Description | GPS Measurement Variables | GPS Measurement Equations |
|---|---|---|
| East | E(GPS) | $E(GPS) = E_{GPS} + v_{E_{GPS}}$ |
| North | N(GPS) | $N(GPS) = N_{GPS} + v_{N_{GPS}}$ |
| Speed | v(GPS) | $v(GPS) = \sqrt{\dot{E}_{GPS}^2 + \dot{N}_{GPS}^2 + \dot{U}_{GPS}^2} + v_{v_{GPS}}$ |
| Heading | γ(GPS) | $\gamma(GPS) = \operatorname{atan}(\dot{E}_{GPS}/\dot{N}_{GPS}) + v_{\gamma_{GPS}}$ |
| Pitch | θ(GPS) | $\theta(GPS) = \operatorname{asin}(\dot{U}_{GPS}/\dot{V}_{GPS}) + v_{\theta_{GPS}}$ |

In Tables 2 through 5, $$\dot{X} = \frac{dx}{dt}.$$

$\beta_X$ is the bias associated with variable X. Biases change over a period of minutes and may be affected, for example, by temperature. $v_x$ is the process noise associated with variable X. X(GPS) is state variable X when GPS fix information is available. $X_{GPS}$ is the value of variable X as determined by GPS.

Table 2 lists state variables and their corresponding state dynamics equations. When GPS signals are available, state variables E, N, U, v, γ and θ are determined by GPS as presented in Table 5. When GPS signals are not available, estimates for the state variables are updated according to the dynamics equations.

Control variables, determined by IMU measurements, are presented in Table 3. The measurement variable (altimeter rate) and corresponding measurement equation are presented in Table 4.

If GPS pseudorange and Doppler measurements are used instead of computed GPS fixes, then GPS clock bias and frequency are included in Kalman filter state equations as presented in Table 6:

TABLE 6

Kalman filter GPS state variables and dynamics equations.

| State Description | State Variables | State Dynamics Equations |
|---|---|---|
| GPS clock bias | B | $\dot{B} = f$ |
| GPS clock frequency | f | $\dot{f} = 0 + v_f$ |

Figure 5:
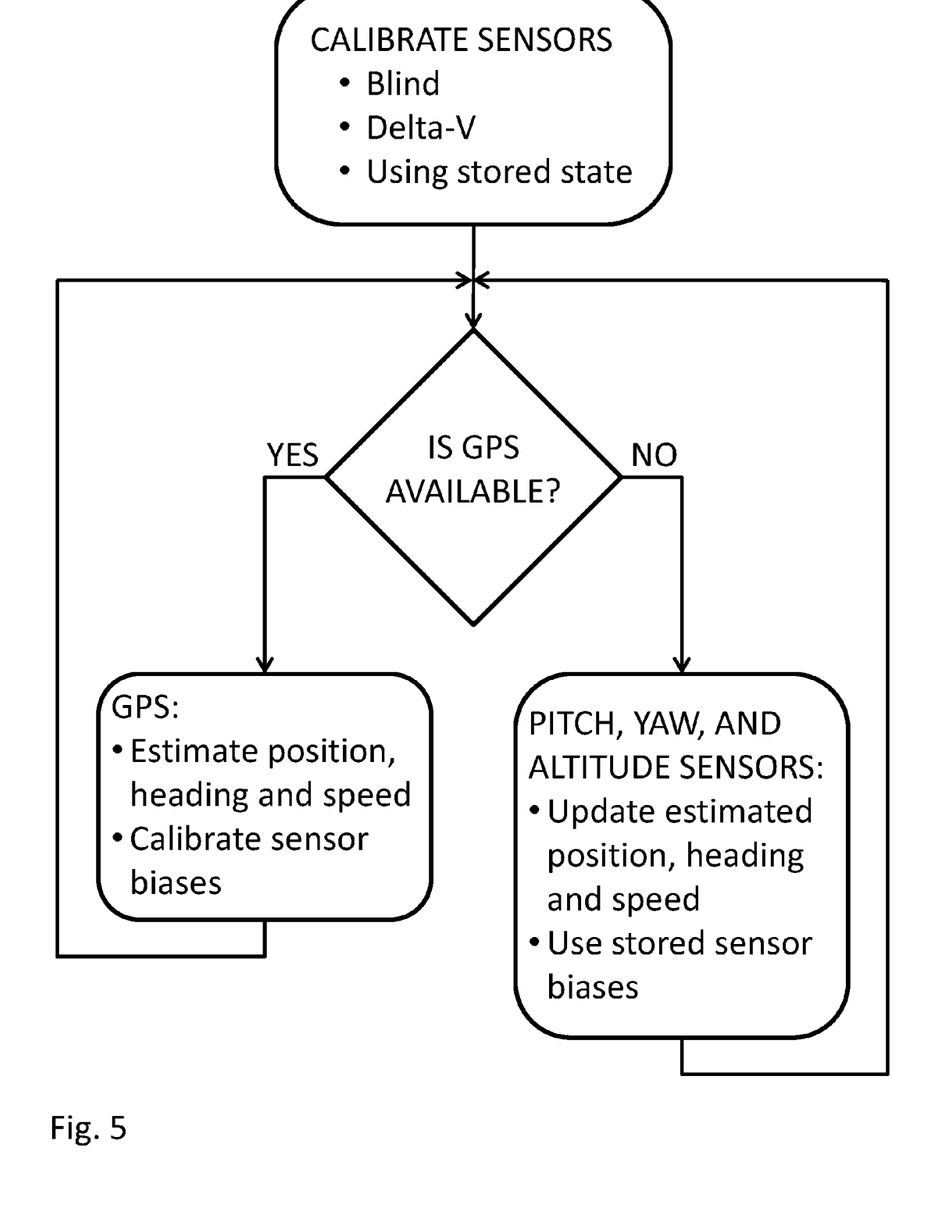
FIG. 5 is a flow diagram for operation modes of a cordless GPS+IMU system.

FIG. 5 is a flow diagram for operation modes of a cordless GPS+IMU system. The system self calibrates its sensors and provides position heading and speed estimates based on GPS and/or IMU sensor measurements.

When the system awakes from being in an off state, the navigation unit self calibrates the IMU sensors. This may be done by retrieving the last stored state of the Kalman filter from memory and calibrating pitch, yaw and altitude sensor biases based on stored information. If the navigation unit is automatically turned on when a vehicle is turned on, it is often safe to assume that wake-up happens when the vehicle is not moving, thus making recalibration simpler. Alternatively, or in addition, calibration may be done using the blind and/or delta-V techniques described above.

If external position information from GPS is available (e.g. from GPS 420), as is the case when several GPS satellites are in view, the navigation unit uses GPS to estimate position, heading and speed, and also to calibrate pitch, yaw, altitude and acceleration sensor biases. Accelerometer arm, L, is also estimated. Optionally, an initial value for L may be input manually.

If external position information is not available, as is the case when driving in a tunnel, for example, the navigation unit uses stored sensor bias information and pitch, yaw, altitude and acceleration sensor measurements to update estimated position, heading and speed.

In conclusion, a cordless GPS+IMU navigation system has been described. The system uses three sensors (pitch rate, altitude and longitudinal acceleration) to estimate speed in the absence of GPS input. The system is self calibrating and corrects for errors due to distance away from the yaw axis of a vehicle. The entire system may be contained in a compact package that may be quickly and conveniently mounted in a vehicle without the need for careful alignment with vehicle axes. The system may also be implemented in a personal digital assistant, smart phone, or other general purpose device having the necessary sensors.

Although the disclosure has discussed satellite based navigation in terms of GPS receivers, clearly other global navigation satellite system (GNSS) (e.g. GLONASS, Galileo, Compass, etc.) receivers may be used instead of, or in combination with, GPS.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein nay be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for estimating position, heading and speed of a wheeled vehicle, the method comprising:
   providing a position sensor, an altimeter, a pitch rate gyro, a yaw rate gyro, a longitudinal accelerometer and a processor; and,
   executing a Kalman filter in the processor to estimate position, heading and speed based on: altitude, pitch rate, yaw rate and longitudinal acceleration information from the altimeter, pitch rate gyro, yaw rate gyro and longitudinal accelerometer, respectively, and position information from the position sensor when position information is available; wherein,
   the Kalman filter ignores lateral acceleration, vertical acceleration and roll rate.

2. The method of claim 1 further comprising executing a Kalman filter in the processor to calibrate altimeter bias, pitch rate gyro bias, yaw rate gyro bias and longitudinal accelerometer bias when position sensor information is available.

3. The method of claim 1 further comprising executing a Kalman filter in the processor to estimate the speed of the vehicle based on altitude, pitch rate and longitudinal acceleration when position sensor information is unavailable.

4. The method of claim 1 further comprising applying a correction to the longitudinal acceleration information based on the distance between the longitudinal accelerometer and a pivot point of the wheeled vehicle.

5. The method of claim 1 further comprising calibrating vertical axes of the pitch rate gyro, yaw rate gyro and longitudinal accelerometer by determining the average direction of maximum acceleration.

6. The method of claim 1 further comprising calibrating longitudinal axes of the pitch rate gyro, yaw rate gyro and longitudinal accelerometer by matching changes in velocities measured by the accelerometer and by a GNSS receiver.

7. The method of claim 6 further comprising calibrating longitudinal axes of the pitch rate gyro and longitudinal accelerometer by matching changes in velocities measured by the accelerometer and by a combination of the GNSS receiver and the yaw rate gyro.

8. The method of claim 1 wherein the position sensor is a GNSS receiver.

9. The method of claim 1 wherein the altimeter comprises a MEMS pressure sensor.

10. The method of claim 1 wherein the pitch rate and yaw rate gyros are MEMS gyros.

11. The method of claim 1 wherein the longitudinal accelerometer is a MEMS accelerometer.

12. A navigation system comprising:
    a position sensor and an altimeter;
    a pitch rate gyro and a yaw rate gyro;
    a longitudinal accelerometer; and,
    a processor that:
    receives altitude, pitch rate, yaw rate and longitudinal acceleration information from the altimeter, pitch rate gyro, yaw rate gyro and longitudinal accelerometer, respectively;
    receives position information from the position sensor when position information is available; and,
    executes a Kalman filter to estimate position, heading and speed of a wheeled vehicle based on available information ignoring lateral acceleration, vertical acceleration and roll rate.

13. The system of claim 12 wherein the processor further executes a Kalman filter to calibrate altimeter bias, pitch rate gyro bias, yaw rate gyro bias and longitudinal accelerometer bias when position sensor information is available.

14. The system of claim 12 wherein the processor further executes a Kalman filter to estimate the speed of the vehicle based on altitude, pitch rate and longitudinal acceleration when position sensor information is unavailable.

15. The system of claim 12 wherein the processor further applies a correction to the longitudinal acceleration information based on the distance between the longitudinal accelerometer and a pivot point of the wheeled vehicle.

16. The system of claim 12 wherein the processor further calibrates vertical axes of the pitch rate gyro, yaw rate gyro and longitudinal accelerometer by determining the average direction of maximum acceleration.

17. The system of claim 12 wherein the processor further calibrates longitudinal axes of the pitch rate gyro, yaw rate gyro and longitudinal accelerometer by matching changes in velocities measured by the accelerometer and by a GNSS receiver.

18. The system of claim 17 wherein the processor further calibrates longitudinal axes of the pitch rate gyro and longitudinal accelerometer by matching changes in velocities measured by the accelerometer and by a combination of the GNSS receiver and the yaw rate gyro.

19. The system of claim 12 wherein the position sensor is a GNSS receiver.

20. The system of claim 12 wherein the altimeter comprises a MEMS pressure sensor.

21. The system of claim 12 wherein the pitch rate and yaw rate gyros are MEMS gyros.

22. The system of claim 12 wherein the longitudinal accelerometer is a MEMS accelerometer.

23. The system of claim 12 further comprising a display that displays the position of the vehicle.

24. The system of claim 12 further comprising a memory that stores position estimates and sensor bias information.

25. The system of claim 12 wherein the system does not include a roll rate gyro.

* * * * *